(12) United States Patent
Szpak et al.

(10) Patent No.: US 8,261,233 B2
(45) Date of Patent: *Sep. 4, 2012

(54) SYSTEM AND METHOD FOR SYNCHRONIZED WORKFLOW MANAGEMENT

(75) Inventors: Peter Szpak, Newton, MA (US); Paulo Pacheco, Westport, MA (US); Christian Robl, Offenberg (DE); Martin Orehek, Munich (DE)

(73) Assignee: The MathWorks, Inc., Natick, MA (US)

( * ) Notice: Subject to any disclaimer, the term of this patent is extended or adjusted under 35 U.S.C. 154(b) by 1138 days.

This patent is subject to a terminal disclaimer.

(21) Appl. No.: 11/841,808

(22) Filed: Aug. 20, 2007

(65) Prior Publication Data
US 2009/0007063 A1 Jan. 1, 2009

Related U.S. Application Data

(63) Continuation of application No. 11/432,939, filed on May 12, 2006, now Pat. No. 8,181,150.

(51) Int. Cl.
*G06F 9/44* (2006.01)
(52) U.S. Cl. ........ 717/105; 717/104; 717/106; 717/107; 717/109; 715/200; 715/203
(58) Field of Classification Search .................. None
See application file for complete search history.

(56) References Cited

U.S. PATENT DOCUMENTS

| | | | |
|---|---|---|---|
| 6,038,393 A | 3/2000 | Iyengar et al. | |
| 6,237,020 B1 | 5/2001 | Leymann et al. | |
| 6,292,933 B1 | 9/2001 | Bahrs et al. | |
| 6,339,838 B1 | 1/2002 | Weinman, Jr. | |
| 6,405,364 B1* | 6/2002 | Bowman-Amuah | 717/101 |
| 6,473,794 B1 | 10/2002 | Guheen et al. | |
| 6,499,023 B1* | 12/2002 | Dong et al. | 706/46 |
| 6,507,844 B1 | 1/2003 | Leymann et al. | |
| 6,536,037 B1* | 3/2003 | Guheen et al. | 717/151 |
| 6,636,242 B2 | 10/2003 | Bowman-Amuah | |
| 6,772,407 B1 | 8/2004 | Leymann et al. | |
| 6,782,379 B2* | 8/2004 | Lee | 1/1 |
| 6,889,363 B2* | 5/2005 | Maloney | 715/765 |
| 6,968,536 B2* | 11/2005 | Jazdzewski | 717/106 |
| 6,973,626 B1 | 12/2005 | Lahti et al. | |
| 7,272,820 B2* | 9/2007 | Klianev | 717/109 |

(Continued)

FOREIGN PATENT DOCUMENTS

EP 0747804 B1 12/1996

(Continued)

OTHER PUBLICATIONS

Title: A generic framework for rapid application development of mobile Web services with dynamic workflow management, author: Mnaouer et al, source: IEEE, dated: Sep. 15, 2004.*

(Continued)

*Primary Examiner* — Chameli Das
(74) *Attorney, Agent, or Firm* — Nelson Mullins Riley & Scarborough LLP

(57) ABSTRACT

A system may identify a workflow associated with a graphical model and execute the workflow in a number of stages. The system may display a number of components of the graphical model and identify which of the displayed components are associated with or affected by execution of a current one of the stages of the workflow.

23 Claims, 15 Drawing Sheets

U.S. PATENT DOCUMENTS

| | | | |
|---|---|---|---|
| 7,305,656 B2 | 12/2007 | Fish et al. | |
| 7,349,837 B2 | 3/2008 | Martin et al. | |
| 7,370,325 B1* | 5/2008 | Hull et al. | 718/102 |
| 7,412,688 B2 | 8/2008 | Liang et al. | |
| 7,451,432 B2* | 11/2008 | Shukla et al. | 717/106 |
| 7,464,366 B2* | 12/2008 | Shukla et al. | 717/100 |
| 7,539,982 B2* | 5/2009 | Stuart | 717/140 |
| 7,614,037 B2* | 11/2009 | Gavrilov | 717/105 |
| 7,703,071 B2 | 4/2010 | Kuester et al. | |
| 7,849,440 B1 | 12/2010 | Englehart | |
| 2002/0049960 A1 | 4/2002 | Monz et al. | |
| 2002/0083415 A1* | 6/2002 | Jazdzewski | 717/111 |
| 2002/0120921 A1* | 8/2002 | Coburn et al. | 717/140 |
| 2002/0128890 A1* | 9/2002 | Dick et al. | 705/8 |
| 2003/0093575 A1 | 5/2003 | Upton | |
| 2003/0095150 A1* | 5/2003 | Trevino et al. | 345/810 |
| 2003/0106039 A1 | 6/2003 | Rosnow et al. | |
| 2003/0115545 A1* | 6/2003 | Hull et al. | 715/500 |
| 2004/0250238 A1* | 12/2004 | Singh et al. | 717/108 |
| 2005/0044529 A1* | 2/2005 | Simons et al. | 717/120 |
| 2005/0050529 A1* | 3/2005 | Vrancic et al. | 717/150 |
| 2005/0183098 A1* | 8/2005 | Ilic et al. | 719/328 |
| 2006/0053172 A1 | 3/2006 | Gardner et al. | |
| 2006/0064670 A1 | 3/2006 | Linebarger et al. | |
| 2006/0074733 A1* | 4/2006 | Shukla et al. | 705/8 |
| 2006/0195817 A1 | 8/2006 | Moon | |
| 2006/0242194 A1 | 10/2006 | Tsyganskiy et al. | |
| 2006/0293934 A1 | 12/2006 | Tsyganskiy et al. | |
| 2007/0011334 A1* | 1/2007 | Higgins et al. | 709/227 |
| 2007/0067373 A1* | 3/2007 | Higgins et al. | 707/206 |
| 2007/0067761 A1 | 3/2007 | Ogilvie et al. | |
| 2007/0157162 A1 | 7/2007 | Ciolfi | |
| 2007/0203683 A1* | 8/2007 | Kornerup et al. | 703/19 |
| 2007/0261019 A1 | 11/2007 | Raghavan et al. | |
| 2007/0266329 A1 | 11/2007 | Gaudette | |
| 2008/0040704 A1 | 2/2008 | Khodabandehloo et al. | |
| 2008/0092111 A1 | 4/2008 | Kinnucan et al. | |
| 2008/0098349 A1 | 4/2008 | Lin et al. | |
| 2008/0134140 A1 | 6/2008 | Weiner et al. | |
| 2010/0050152 A1 | 2/2010 | Gilboa | |
| 2011/0093835 A1 | 4/2011 | Ciolfi | |

FOREIGN PATENT DOCUMENTS

| | | |
|---|---|---|
| EP | 1643435 A1 | 4/2006 |
| WO | WO-94/06074 A1 | 3/1994 |

OTHER PUBLICATIONS

Title: A general framework for the execution of heterogenous programs in workflow management systems, author: Schuster, H et al, source: IEEE, dated: Jun. 19, 1996, source: IEEE.*

No Magic, Inc., magicdrawa, User's Manual, version 9.0 (2005).

European Office Action for Application No. 07809076, dated Jan. 28, 2010.

No Magic, Inc., "magicdraw™ User's Manual, version 10.5," (2005).

Springgay, Dave, "Using Perspectives in the Eclipse UI," Eclipse Corner Article, Object Technology International, Inc. (2001).

Invitation to Pay Additional Fees for Application No. PCT/US20070011516, dated Apr. 4, 2008.

Nicholson, Matt, "Inside Software Factories," DNU Online, retrieved online at http://dnjonline.com/article.aspx?ID=mar05_stevecook (2005).

Al-Roki, Hathal et al., "Workflow Modelling in Flexible Based Environments," IEEE International Conference on Systems, Man, and Cybernetics, vol. 3:1972-1977 (2001).

Jianping, Xing et al., "The Research of a New Workflow Model with Step-Task Layers Based on XML Documents," Proceedings of the 2006 IEEE/WIC/ACM International Conference, pp. 970-973 (2006).

* cited by examiner

SYSTEM AND METHOD FOR SYNCHRONIZED WORKFLOW MANAGEMENT

RELATED APPLICATION

This application is a continuation of U.S. patent application Ser. No. 11/432,939, filed May 12, 2006, the entire content of which is incorporated by reference herein.

FIELD OF THE INVENTION

The illustrative embodiment of the present invention relates generally to workflows in graphical modeling environments, and more particularly to a workflow manager synchronized with the graphical modeling environment.

BACKGROUND

Graphical programming languages and graphical modeling environments enable the construction of graphical models such as block diagram models, entity flow models, flow diagrams, computational noncausal models, and statechart models. Graphical programming languages provide a wide array of functionality that may be utilized during model design. Frequently there is more than one approach to solving a particular problem, achieving a particular goal, or following a proven procedure. Achieving a particular goal often requires a set of tasks that are unknown or difficult for a novice user to grasp. A workflow describes the set of tasks that must be completed in order to accomplish particular goals during the design of a graphical model.

Some conventional graphical programming languages provide tools that assist a user in identifying problems with a design and further facilitate the implementation of recommendations designed to address the problems. Unfortunately, these conventional tools provide advice that is relatively unstructured in that the advice is not closely associated with a particular portion of a workflow. Additionally these conventional tools do not tailor the graphical modeling environment for a particular task that the model designer is attempting to accomplish. It would be desirable to provide a workflow management tool that provides structured advice and is able to reconfigure the graphical modeling environment in a manner suitable for the particular workflow that is being executed by the model designer.

SUMMARY

The illustrative embodiment of the present invention provides a workflow manager that offers structure and control over the graphical modeling environment so that the graphical modeling environment is reconfigured in a manner appropriate for a particular workflow. The workflow manager of the present invention provides hierarchical task management that is synchronized to the graphical modeling environment. The workflow manager allows a model designer to navigate a series of steps required to achieve the goal of a particular workflow. An application programming interface (API) allows the steps to be customized as required by the end user.

According to one aspect, a computer-readable medium may contain instructions executable by at least one processor. The computer-readable medium may include one or more instructions for receiving a workflow associated with a graphical model; one or more instructions for executing a portion of the workflow; one or more instructions for synchronizing a display of one or more components of the graphical model relating to the portion of the workflow with execution of the portion of the workflow; and one or more instructions for permitting a user to interact with the workflow via the display.

According to another aspect, a computing device may include a graphical programming environment including instructions for implementing a graphical model, a workflow associated with the graphical model, where the workflow may include a number of tasks, and a workflow manager to execute at least one of the tasks of the workflow, and synchronize a display of one or more components of the graphical model relating to the at least one task with execution of the at least one task. The computing device may also include a processor to execute the instructions of the graphical programming environment.

According to yet another aspect, a method may include identifying a workflow associated with a graphical model, where the workflow may include a number of tasks; executing at least one of the tasks of the workflow; displaying a plurality of components of the graphical model; and identifying which of the displayed components are associated with or affected by execution of the at least one task while the at least one task is being executed.

According to a further aspect, a system may include means for identifying a workflow associated with a graphical model; means for executing the workflow in a number of stages; means for displaying a number of components of the graphical model; and means for identifying which of the displayed components are associated with or affected by execution of a current one of the stages of the workflow.

BRIEF DESCRIPTION OF THE DRAWINGS

The invention is pointed out with particularity in the appended claims. The advantages of the invention described above, as well as further advantages of the invention, may be better understood by reference to the following description taken in conjunction with the accompanying drawings, in which:

DETAILED DESCRIPTION

The workflow manager of the illustrative embodiment of the present invention programmatically tailors and customizes the graphical modeling environment into a form appropriate for an identified workflow associated with a graphical model. By tailoring the graphical modeling environment to the workflow, the design process becomes more focused and efficient. The synchronization of the different views of the model design to the workflow allow the user to ascertain how design choices made at each step of the workflow affect the model components impacted by that step of the workflow. The ability to create and restore snapshots of the workflow process allows the design process to be started and stopped efficiently from a number of different points in the workflow without the need to restart the workflow from the beginning of the process.

Figure 1:
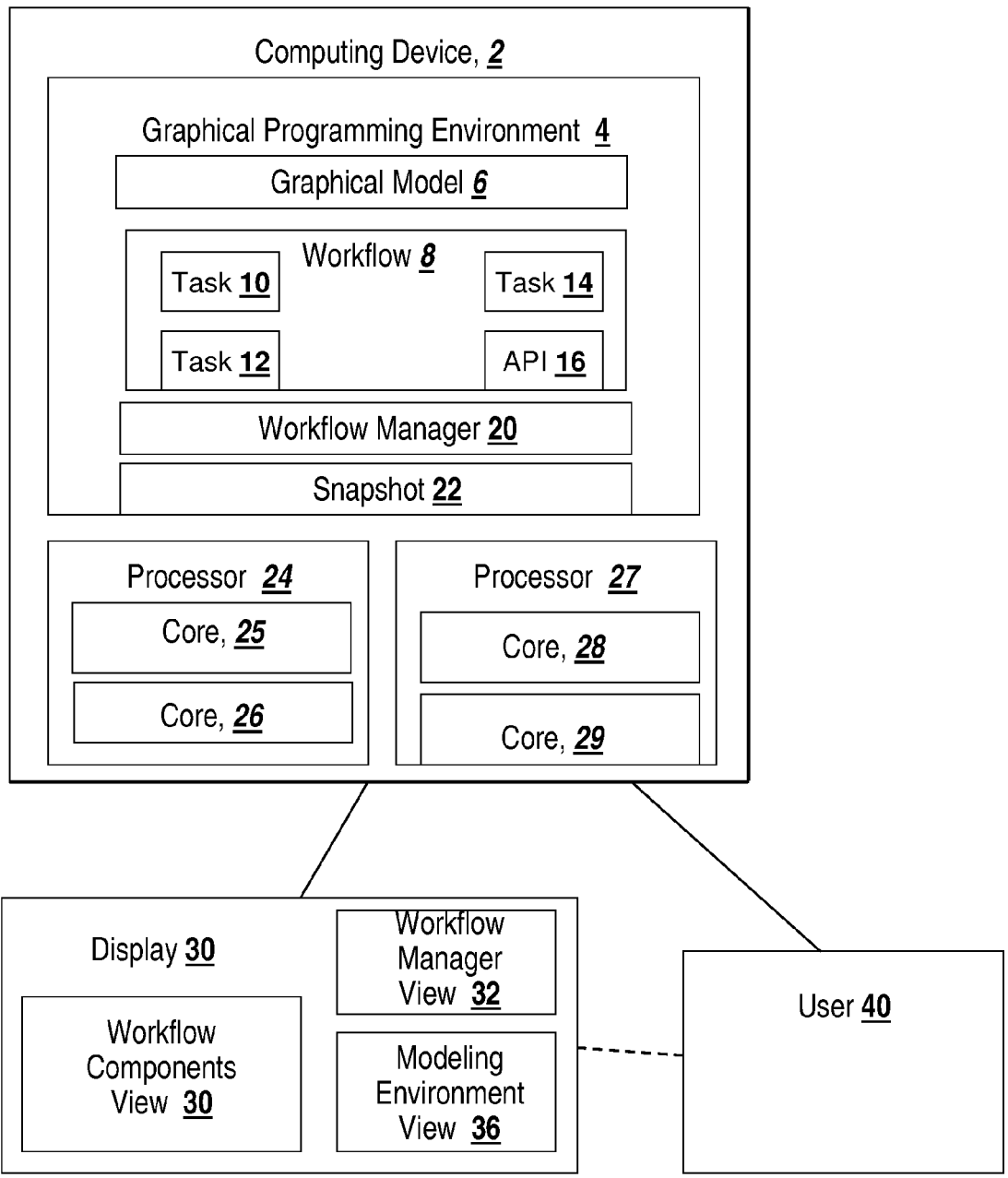
FIG. 1 depicts an environment suitable for practicing the illustrative embodiment of the present invention.

FIG. 1 depicts an environment suitable for practicing the illustrative embodiment of the present invention. A computing device 2 supports a graphical modeling environment 4. Graphical modeling environments are programs that enable a user to construct and analyze a model of a process or system. Examples of modeling formalisms that are supported by graphical modeling tools include time-based block diagrams, such as supported by Simulink from The MathWorks Inc., discrete event diagrams and reactive state machine diagrams, such as those supported by Stateflow® from The MathWorks, Inc., data-flow diagrams, such as those supported by LabVIEW, available from National Instruments Corporation, entity flow modeling tools such as SimEvents, rigid body modeling tools such as SimMechanics both available from The MathWorks, Inc., and software diagrams and other graphical modeling languages, as found, for example, in Unified Modeling Language (UML) diagrams such as supported by Rational from IBM and Rhapsody from I-Logix. The computing device 2 may be a computing device such as a workstation, server, laptop, mainframe, PDA (personal digital assistant), a game platform, tablet PCs, a mobile telephone, a cluster of devices operating together, a virtual device or another computing device able to support the graphical modeling environment 4. The computing device 2 may have a single processor 24 or multiple processors 24 and 27 and the processors may be single-core processors 25 or multi-core processors 25 and 26 and 28 and 29.

The graphical modeling environment 4 includes at least one graphical model 6. The graphical modeling environment 4 also includes at least one workflow for the graphical model 6 that may be identified by a user 40. The workflow 8 may include a set of tasks 10, 12 and 14 that are required to accomplish the goal associated with the workflow. The workflow 8 may be manipulated via an API 16 that allows the user 40 to define and customize the workflow 8. The API defines and manages the workflow. The API allows one to register the specific tasks of a workflow, along with their relative order, optionally a partial order, and dependencies of tasks that, in turn, may be conditional. The API also allows one to specify the structure of the workflow along with the referential integrity between tasks (i.e., which tasks are dependent on each other). The API 16 may also allow a user to define and customize a new workflow for the graphical model 6. Exemplary workflows include a workflow for converting a model from a floating point implementation to a fixed-point implementation, a workflow for converting a model from one type of fixed point implementation to another type of fixed point implementation, a workflow for converting a model from a continuous-time implementation to a discrete-time implementation, a workflow to optimize a model to enhance simulation performance, a workflow to configure a model for optimal code generation, a workflow to instrument a model for data logging, a data management workflow, a code generation workflow, a verification and validation (V&V) workflow to assess the correctness and robustness of a design, a workflow to prepare a model for connecting with instrumentation hardware, a workflow to configure 'reconfigurable input/output (I/O)', a workflow to setup instruments and a workflow for validating the matching of model interfaces, a workflow for calibrating a model to acquired data. Those skilled in the art will recognize that many additional workflows may also be managed by the workflow manager of the present invention and that the above list is included for illustrative purposes rather than to provide an exhaustive listing of all of the workflows available to the present invention. Furthermore it will also be appreciated that a workflow may be nested within another workflow or referenced by another workflow so that the execution of a first workflow is dependent on a second workflow.

The graphical modeling environment also includes a workflow manager 20 that synchronizes the workflow to the graphical modeling environment 4 and progressively tailors the graphical modeling environment based on the current state of the workflow 8. The workflow manager 20 is discussed in further detail below. The workflow manager 20 of the present invention also allows the user 40 to create a snapshot 22 of the current state of the execution of the workflow 8. It will be appreciated that although the snapshot 22 is depicted as being stored in the graphical modeling environment 4 on the computing device 2, the snapshot may be stored in other locations accessible to the workflow manager 20 without departing from the scope of the present invention. It will be recognized by those skilled in the art that the workflow manager 20 may be integrated into the graphical modeling environment 4 as a software tool, may be a plug-in for the graphical modeling environment, or alternatively may be a separate application or process communicating with the graphical modeling environment 4.

The computing device 2 communicates with a display 30 such as a computer monitor, television set or some other type of display device. The display 30 may display a view 32 of a listing of the components affected by the identified workflow 8. The display may also display a dialog workflow manager view 34 alternately with a graphical depiction of the graphical model referred to herein as a modeling environment view 36. Exemplary modeling environment views include views of a block diagram editor, a data flow diagram editor, a text-based block inside a graphical diagram (the block may hold instructions in a dynamically typed language), a statechart, a sequence diagram, a class diagram, a physical modeling view, and a data explorer view. In other implementations, other non-visual indicators such as audio or tactile feedback indicators may be used to indicate a component affected by the task in the workflow.

Figure 2:
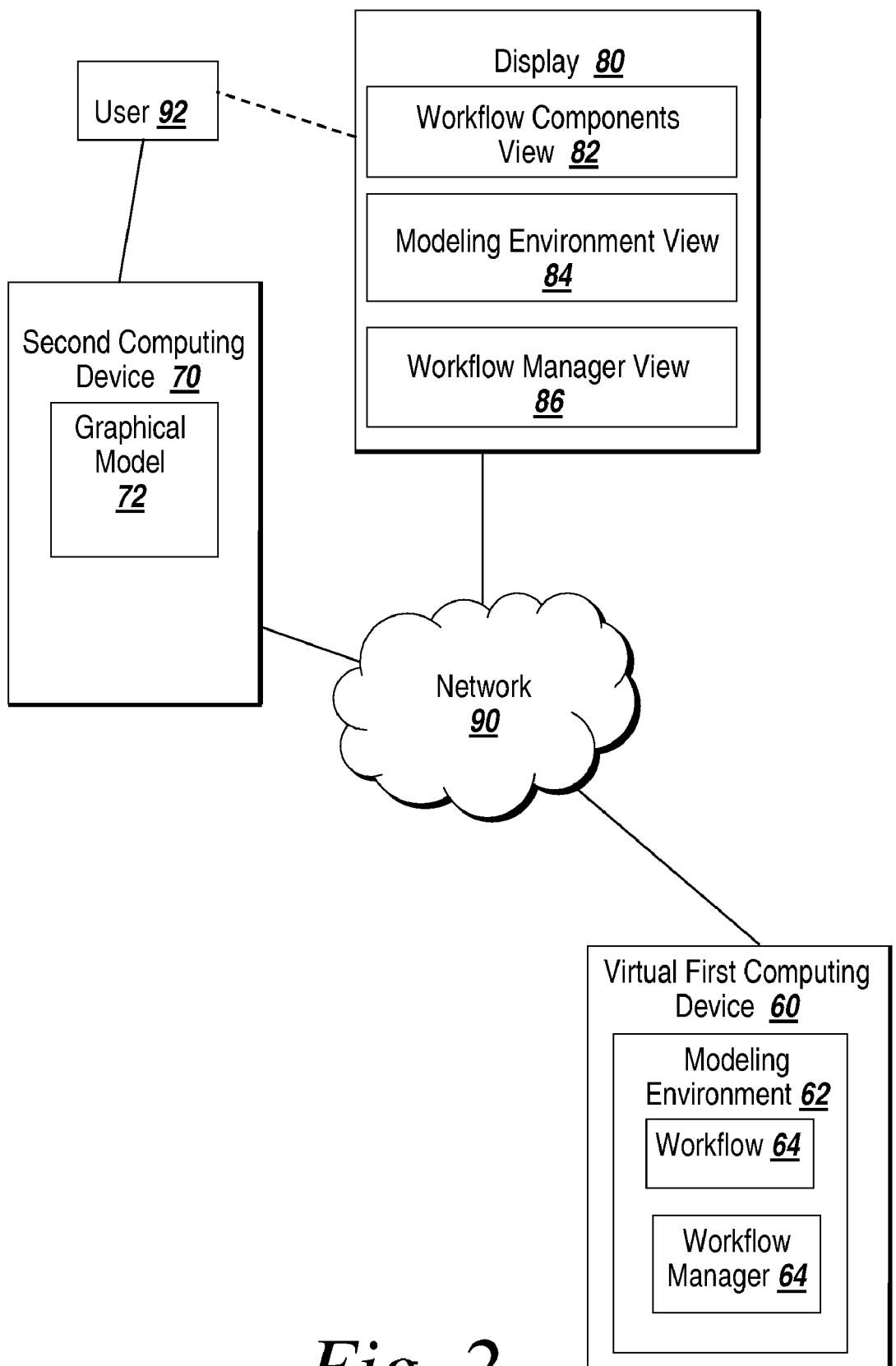
FIG. 2 depicts an alternative distributed environment suitable for practicing the illustrative embodiment of the present invention.

The workflow manager of the present invention may also be utilized in a distributed environment. FIG. 2 depicts an alternative distributed environment suitable for practicing the illustrative embodiment of the present invention. A virtualized first computing device 60 hosts a modeling environment 62. It will be appreciated that the first computing device 60 could also be a physical device. The modeling environment 62 includes at least one workflow 64 that is associated with a graphical model and the workflow manager 66. In other implementations, the workflow manager 66 may be in communication with, or integrated into, additional third-party workflow tools. A user 92 accesses a second computing device 70 to communicate over a network 90 with the modeling environment 62 on the first computing device 60. The network 90 may be the Internet, a local area network (LAN), a wide area network (WAN), a wireless network, an intranet, an extranet or some other type of network. The second computing device 72 may include a graphical model 72 that is transmitted by the user 92 to the modeling environment 62. In another implementation, the workflow 64 may be located on the second computing device 70 while the graphical model 72 is located on the first computing device. Alternatively, both the workflow 64 and the graphical model 72 may be located in the modeling environment 62. In an alternative implementation, a server may be used to download code to be executed on a client device in order to practice the illustrative embodiment of the present invention. Other alternative distributed architectures in addition to those discussed here will be apparent to those skilled in the art and are considered to be within the scope of the present invention.

The second computing device 70 is in communication with a display 80 upon which the output of the modeling environment 62 (which is transmitted over the network 90) may be displayed to the user 92. The display 80 may include a workplace component view 82, a modeling environment view 84 and the workflow manager dialog view 86. The different views 82, 84 and 86 may be displayed simultaneously, singly or in various combinations.

The workflow manager 20 of the present invention tailors the graphical modeling environment by synchronizing the model components with the workflow and eliminating or otherwise indicating which components are associated with the current step of the workflow and which are extraneous. It will be appreciated that more than one workflow may be active at a time (and synchronized with the modeling environment) by the workflow manager 20. When more than one workflow is active at a time, the workflows may share data as well as control. In order to better explain the workflow manager 20, FIGS. 3A-6B provides a series of screenshots which illustrate the usage and functionality of the workflow manager in a SIMULINK environment. It will be appreciated that the workflow manager 20 of the present invention may be employed in many different graphical modeling environments in addition to a SIMULINK environment.

Figure 3A:
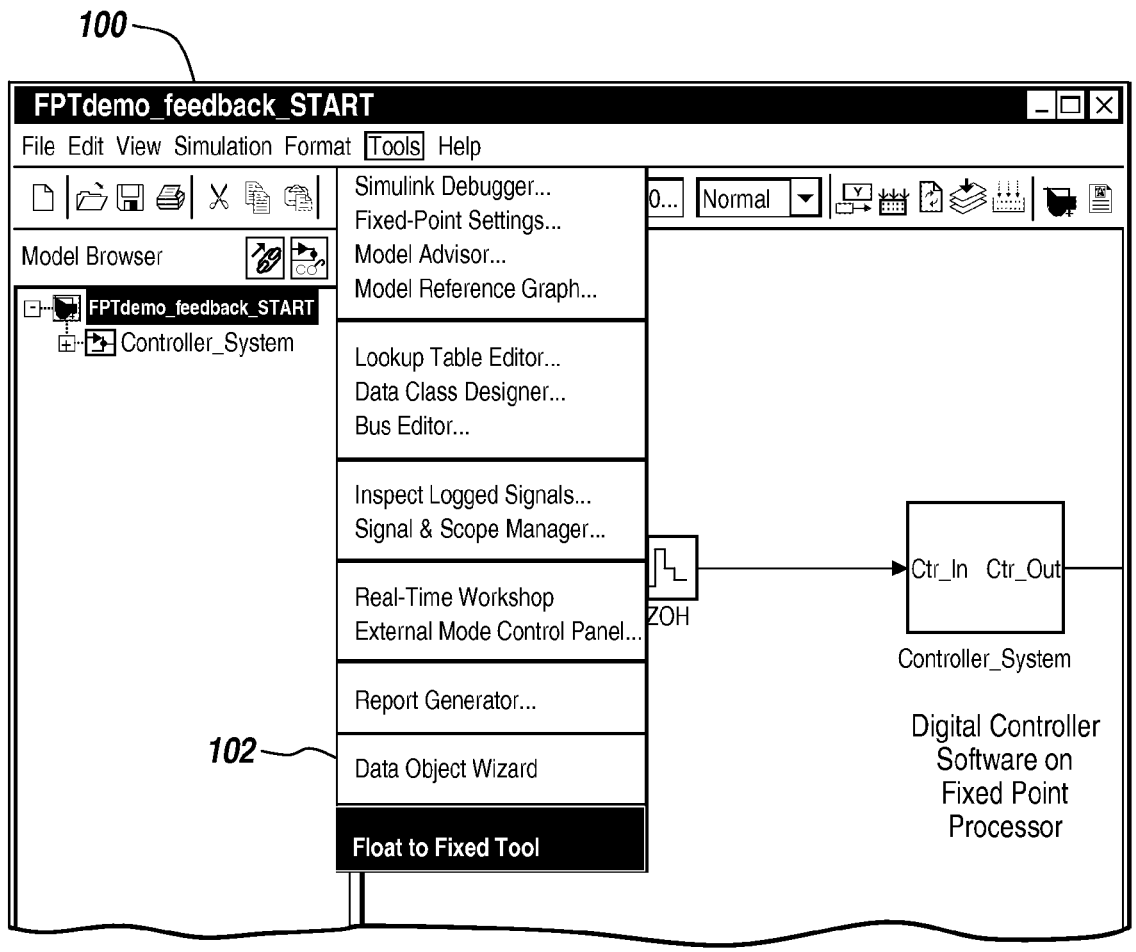
FIG. 3A depicts a screenshot of the selection of a user-identified workflow.

FIG. 3A depicts the initialization of the workflow manager for a SIMULINK model with a particular goal in mind, the execution of a workflow converting a floating point SIMULINK model to a fixed-point equivalent. The screenshot 100 shows the user selecting an identified workflow 102 from a menu option. It will be appreciated that other mechanisms for selecting a provided workflow from the graphical modeling environment 4 may be utilized within the scope of the present invention. Alternatively, the user may provide the workflow to the graphical modeling environment by providing a location of a stored workflow rather than selecting the workflow from a menu option.

The workflow may be stored in a database or a file. The workflow may be stored in an XML format. The workflow may be subjected to version control as well as configuration control (as a workflow can reference other workflows). The stored workflows may be subjected to differencing and merging operations. Furthermore, documentation of the workflow can be generated, for example in portable document format (PDF), POWERPOINT (PPT), or Hypertext Markup Language (HTML) format, which may show the workflow structure, conditions, requirements, configuration actions, etc. The documentation may be in a textual format or a graphical format. Moreover, a (partial) workflow may be constructed from a file. For example, a number of slides in POWERPOINT (from Microsoft Corporation of Redmond, Wash.) can be imported and converted into a workflow (framework), including the branching points that POWERPOINT facilitates. In the case of a partial workflow (e.g., a workflow framework or template), a workflow editor may be used to supply missing details. The completed workflow may then be exported back to the original or another file format.

Figure 3B:
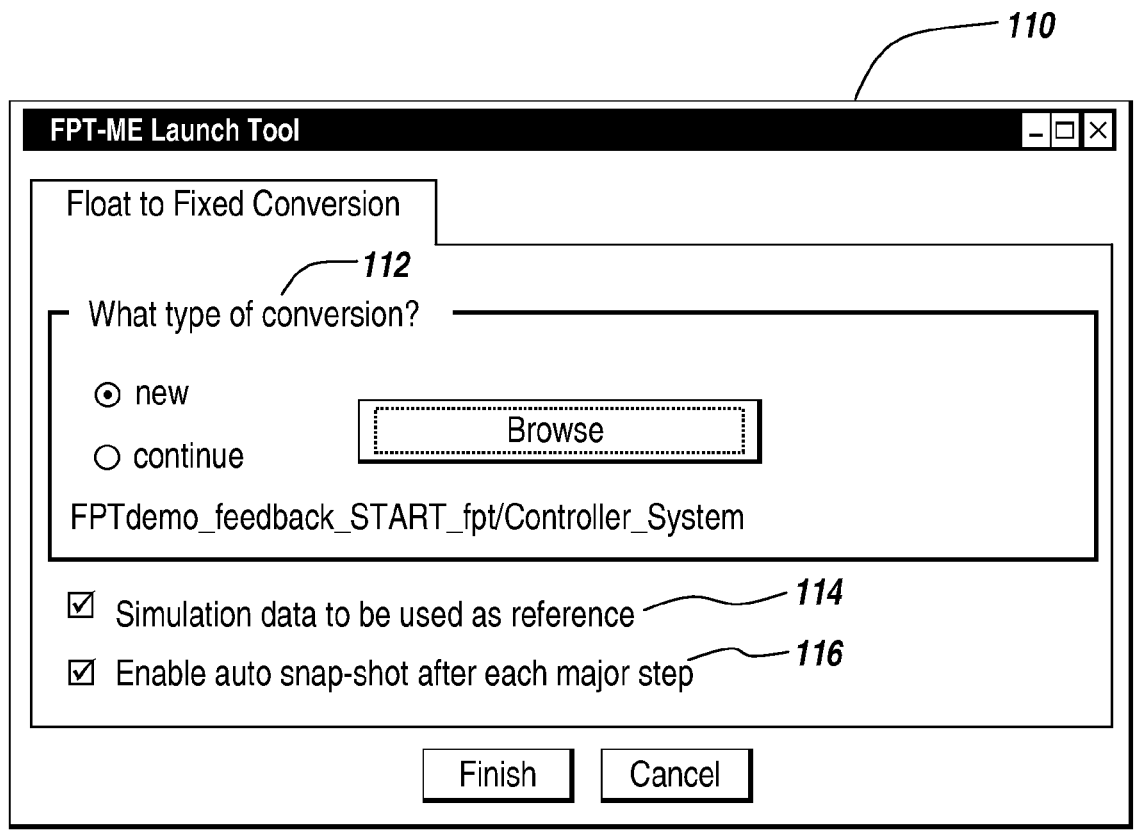
FIG. 3B depicts a screenshot of the solicitation of user input by the workflow manager in order to simplify the chosen workflow.
Figure 3C:
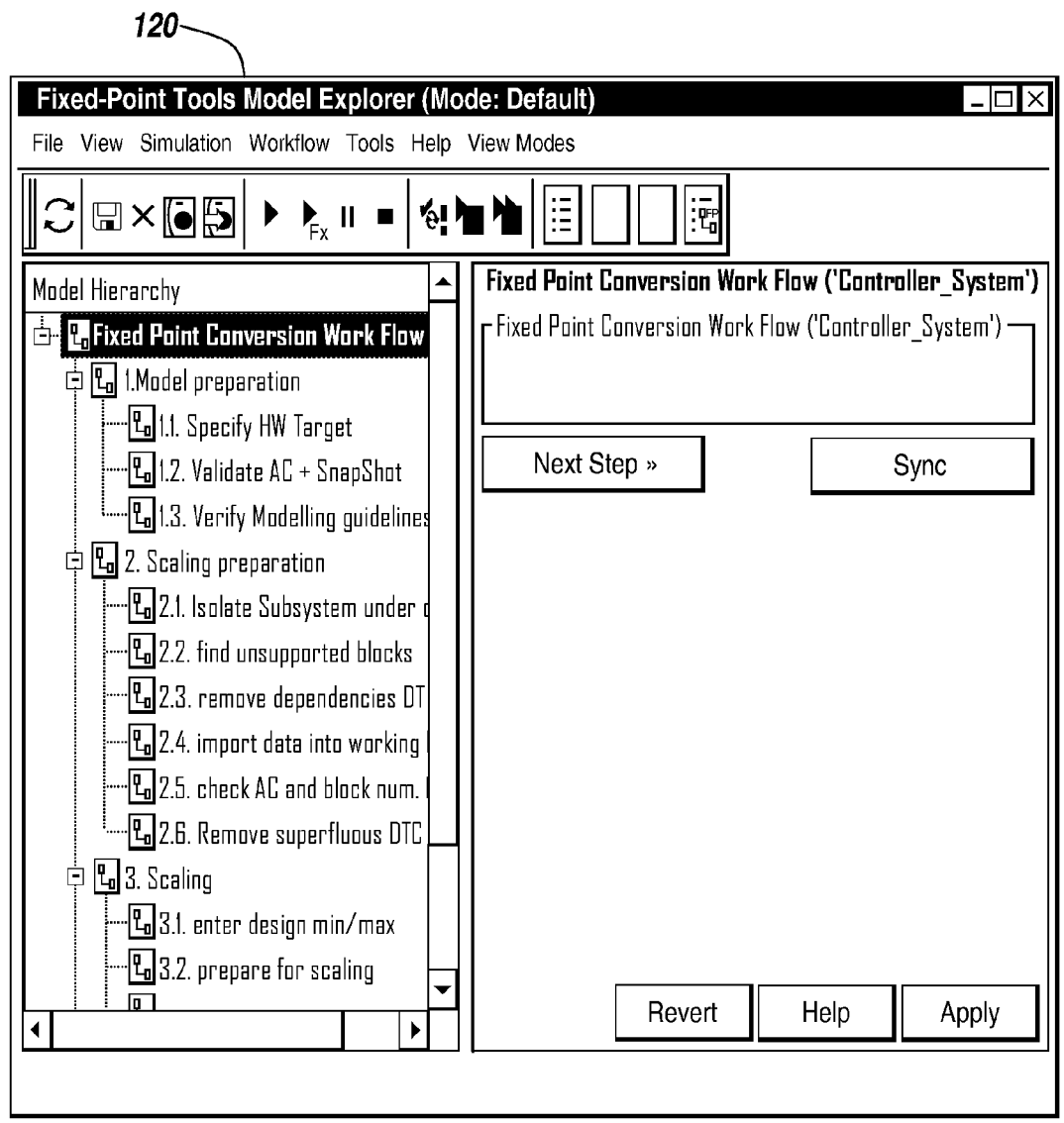
FIG. 3C depicts a screenshot of a hierarchical view of the tasks relevant to the identified workflow and based on the user input solicited in FIG. 3B.

FIG. 3B depicts a screenshot 110 of the querying performed by the workflow manager 20 in an attempt to simplify the workflow steps. Thus, the user is questioned to determine whether the conversion is new or a continuation 112, whether simulation data is to be used as a reference 114 and whether a feature that takes an automatic snapshot after each major step should be enabled 116. It will be appreciated that the substance of the queries will vary according to the nature of the workflow. FIG. 3C depicts a screenshot of the workflow manager 20 presenting a hierarchical workflow view 122 showing the hierarchy of steps/tasks required by the workflow. The workflow in FIG. 3C is a streamlined workflow based on the information provided above along with any customization to the workflow through the API discussed below. The workflow is streamlined in that it includes the necessary tasks based on the user input indicating that simulation data is available. If the user response to the queries had not indicated that simulation data was to be used, then those tasks associated with the simulated data would be removed from the workflow. The workflow is synchronized to the modeling environment. The workflow manager can act on any portion or the entirety of a model or models including the content of links such as model reference blocks and library blocks. In the example depicted in FIG. 3C, the workflow is targeted to the "Controller System" portion of the model. It should be noted that a tree view of the workflow tasks is just one aspect of the invention. Alternate methods of presenting the workflow are possible: for example, as a flow chart, state diagram, directed graph, with or without cycles or other graphical view.

A workflow may contain active parts so that once a workflow is selected, it may do whatever tasks it can automatically before relinquishing control to the user. Or, performing certain tasks automatically can be invoked when a user has prepared a model up to a certain point within one workflow stage. For example, once a sample rate is selected for the overall model and a desired solver that satisfies prerequisites, the workflow can invoke an automatic discretization of continuous time blocks. Before this discretization, it may also be required that the user removes incompatible blocks. Also, selecting a workflow may automatically select certain configuration options (e.g., for code generation).

Figure 3D:
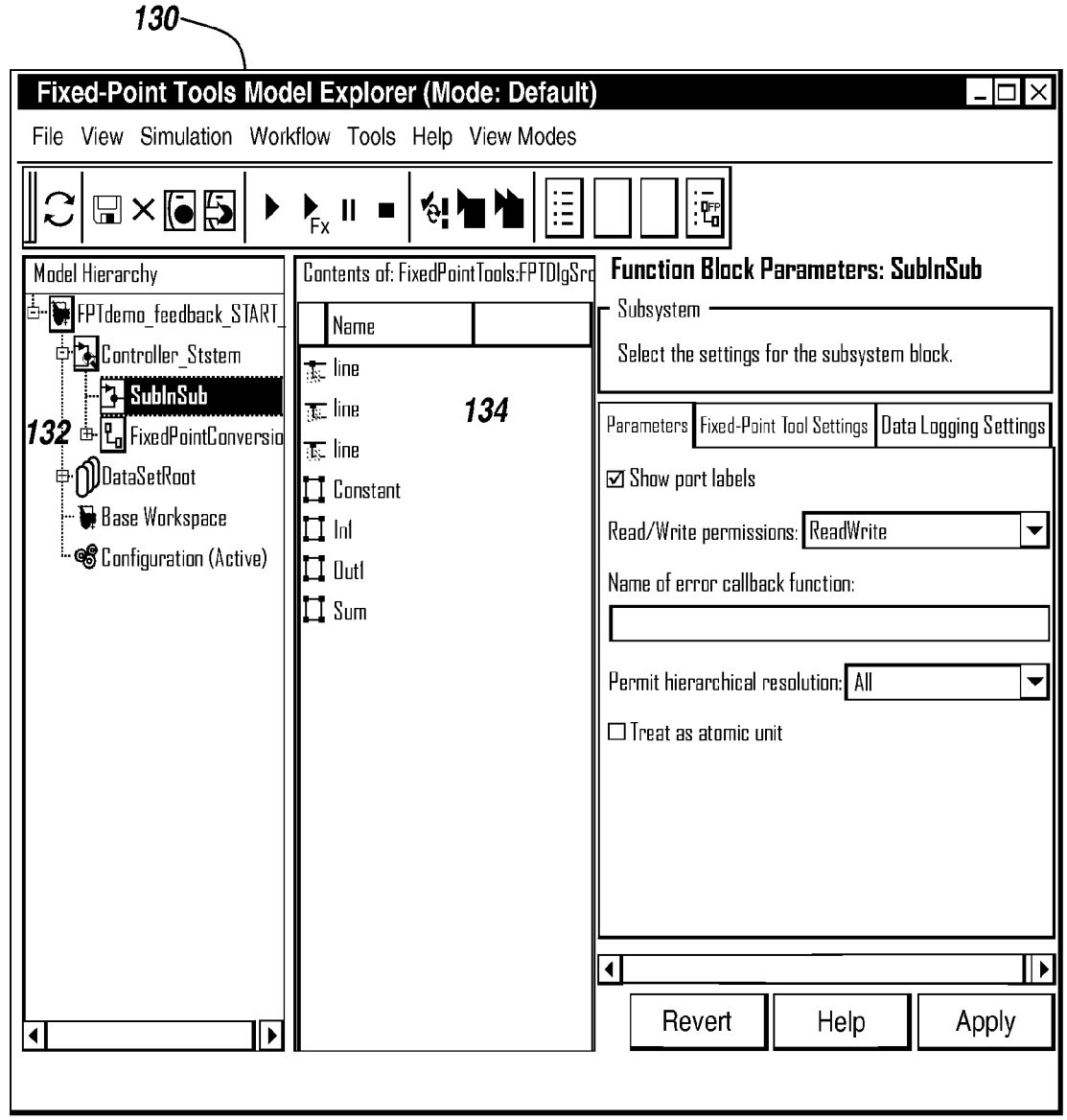
FIG. 3D depicts the model environment in a default configuration.
Figure 3E:
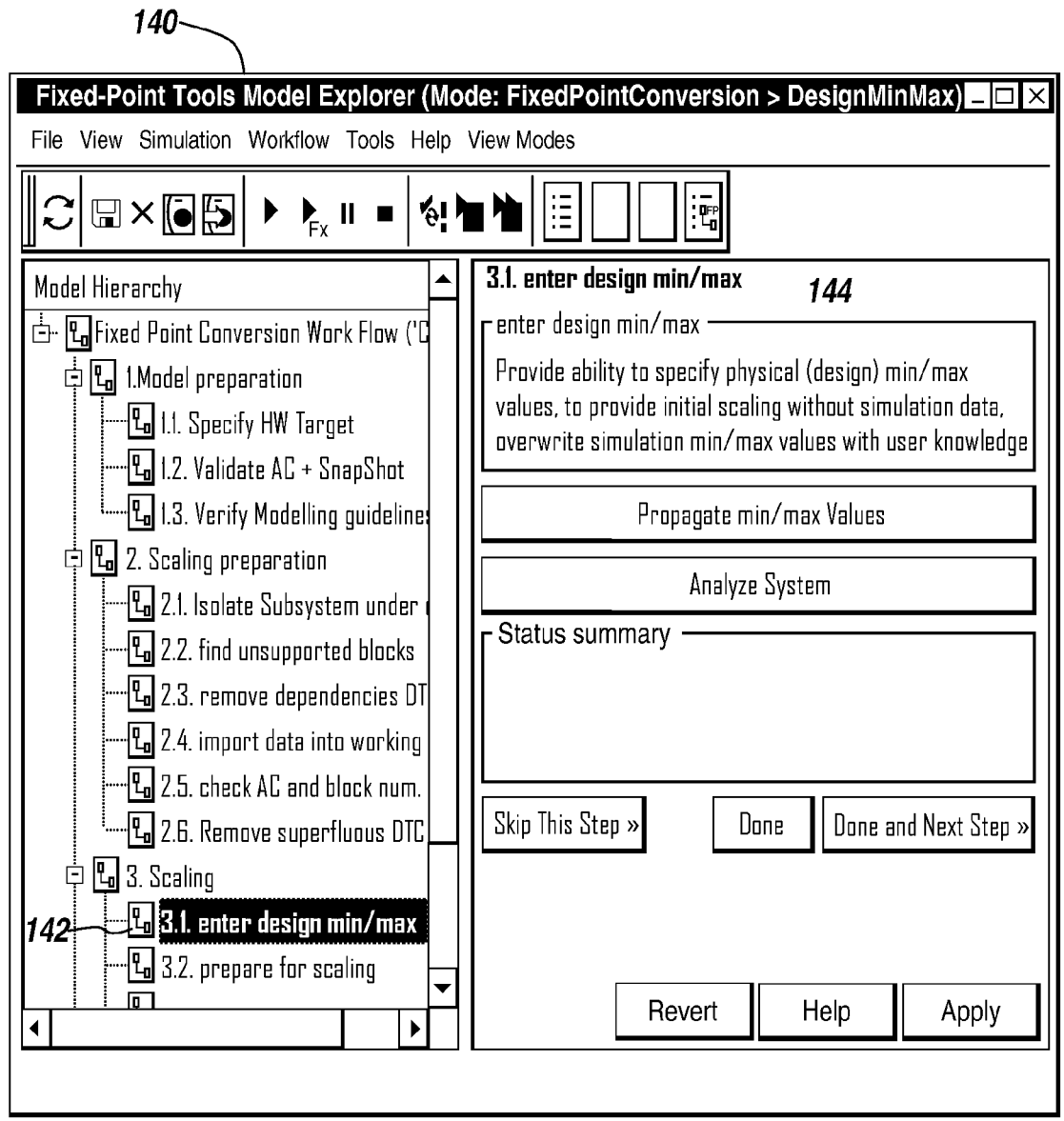
FIGS. 3E-3F depict a screenshot of a user selection of a particular step in the presented workflow and the subsequent reconfiguring of the graphical modeling environment to show the relevant portions of the model.
Figure 3F:
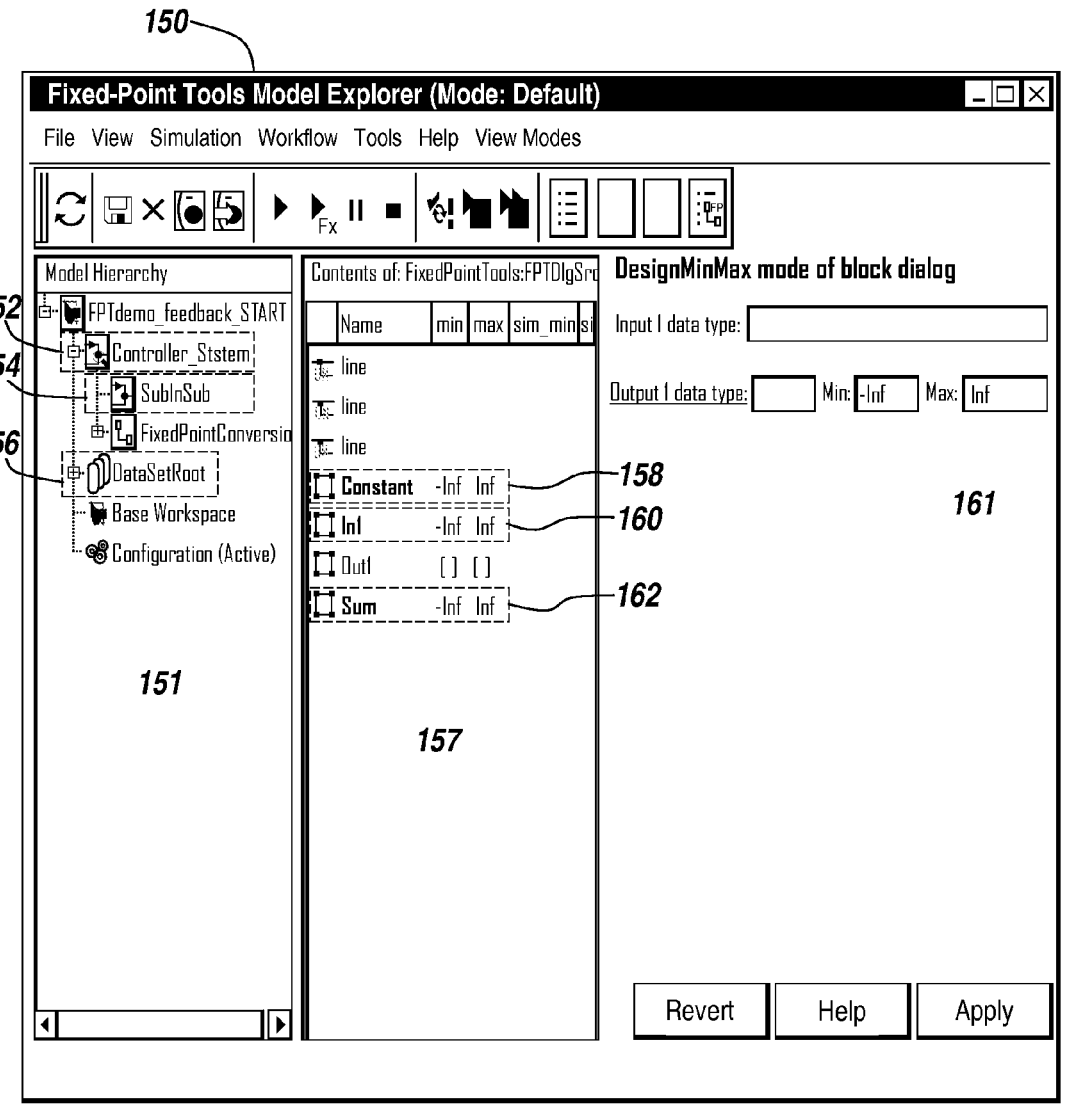

The workflow manager 20 provides a hierarchical description of the steps necessary to complete a specific task. One aspect of the present invention is that the workflow manager 20 is synchronized to the modeling environment in a way that reconfigures the entire modeling environment (or select portions of the modeling environment if desired) specific to the task at hand. For example, the workflow manager 20 may reconfigure libraries or a set of blocks available for usage. The workflow manager 20 may also be coupled to a modeling style guideline so that selecting a workflow will result in a particular modeling style guideline being used. As another example of the synchronization of the modeling environment with the workflow, the screenshot 130 of FIG. 3D depicts the model environment in a default configuration when no particular step is selected. The default view includes a listing 134 of the graphical model components, in the case of the present example these components are blocks and connections from the block diagram model. After the selection and expansion of the fixed point conversion workflow 132 and a selection of the step 142 for entering a design min/max as depicted in the screenshot 140 of FIG. 3E, the model environment is reconfigured by the workflow manager. The workflow manager presents a new window pane 144 that includes information related to the current step. The workflow manager synchronizes the workflow step to the alternate views in the modeling environment. Thus FIG. 3F depicts a screenshot 150 that provides indicators (in this example broken lines) showing which components 158, 160 and 162 are affected by the current step in the workflow in the model contents pane 157 and which parts 152, 154 and 156 of the model hierarchy are associated with the current step in the workflow in a model hierarchy pane 151. The workflow manager also provides an additional workflow manager view dialog 161 that requests additional information from the user for the particular step. It will be appreciated that the selection of other steps in the workflow would reconfigure the environment specific to that task. For example, the step "prepare for scaling" will reconfigure the modeling environment to display views where data type and scaling information is applicable. The manner and extent to which the environment is reconfigured between tasks is up to the workflow author. The corresponding modeling environment view depicted in the screenshot 170 of FIG. 3G also graphically indicates which model components 172, 174 and 176 in the block diagram model are affected by the current step in the workflow. The synchronized information provides the designer with a better understanding of the effect of his design choices on the model than is possible with conventional tools.

The workflow manager tailors the graphical modeling environment based upon the current stage in the execution of the workflow. The configuration and arrangement of the environment can change for specific tasks or be shared among tasks, which may be configured within the workflow API. The workflow manager analyzes each workflow step to identify which components in the current model are affected by the current step's execution. For example, if the workflow calls for the alteration of a "sum" block in a block diagram model, the workflow manager can analyze the block diagram model to determine which other blocks are affected, directly or indirectly in a change in the sum block. Each of those blocks and the sum block would then be identified for the user. The author of a particular workflow determines the requirements of each task in a workflow, and programs the workflow via the workflow API. The workflow API allows the author to include analysis, visualization, actions, and artifact archival for each task in the workflow.

Figure 3G:
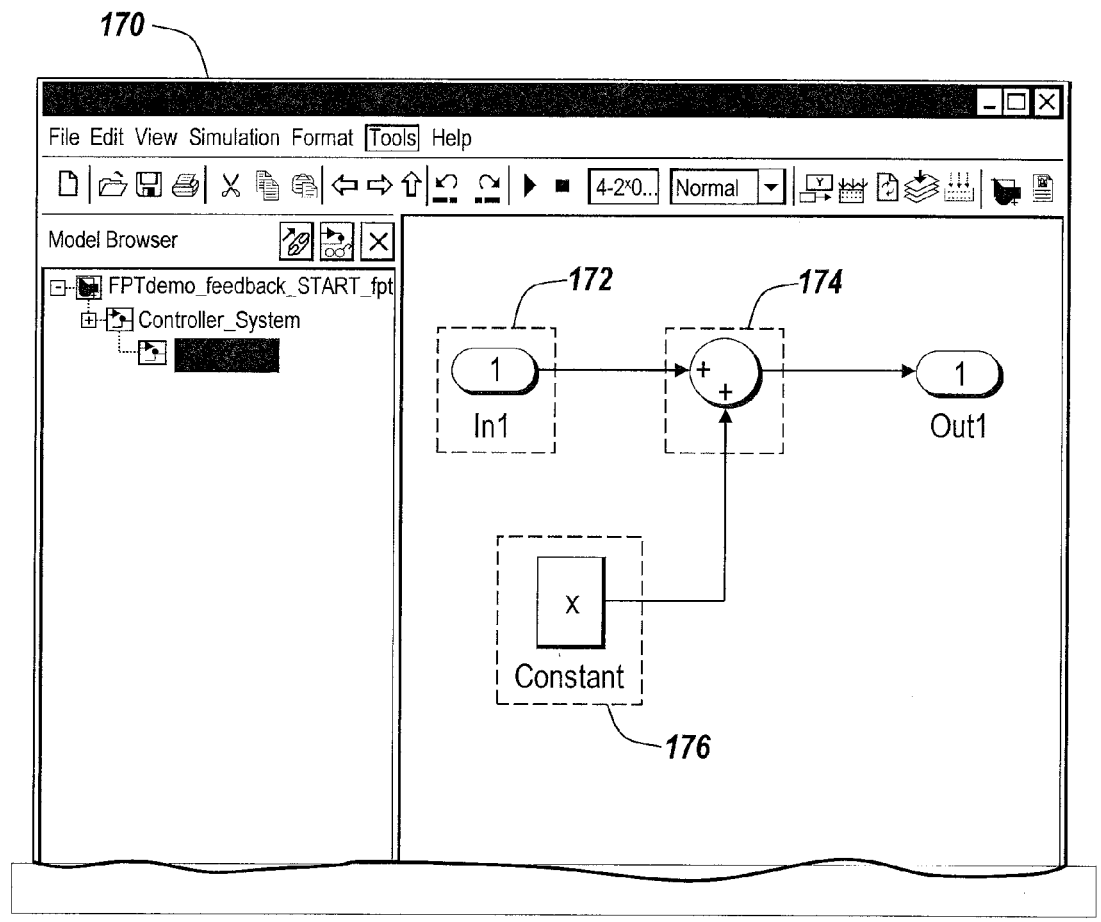
FIG. 3G depicts a screenshot of the graphical model editor highlighted to show the model components relevant to a task.
Figure 3H:
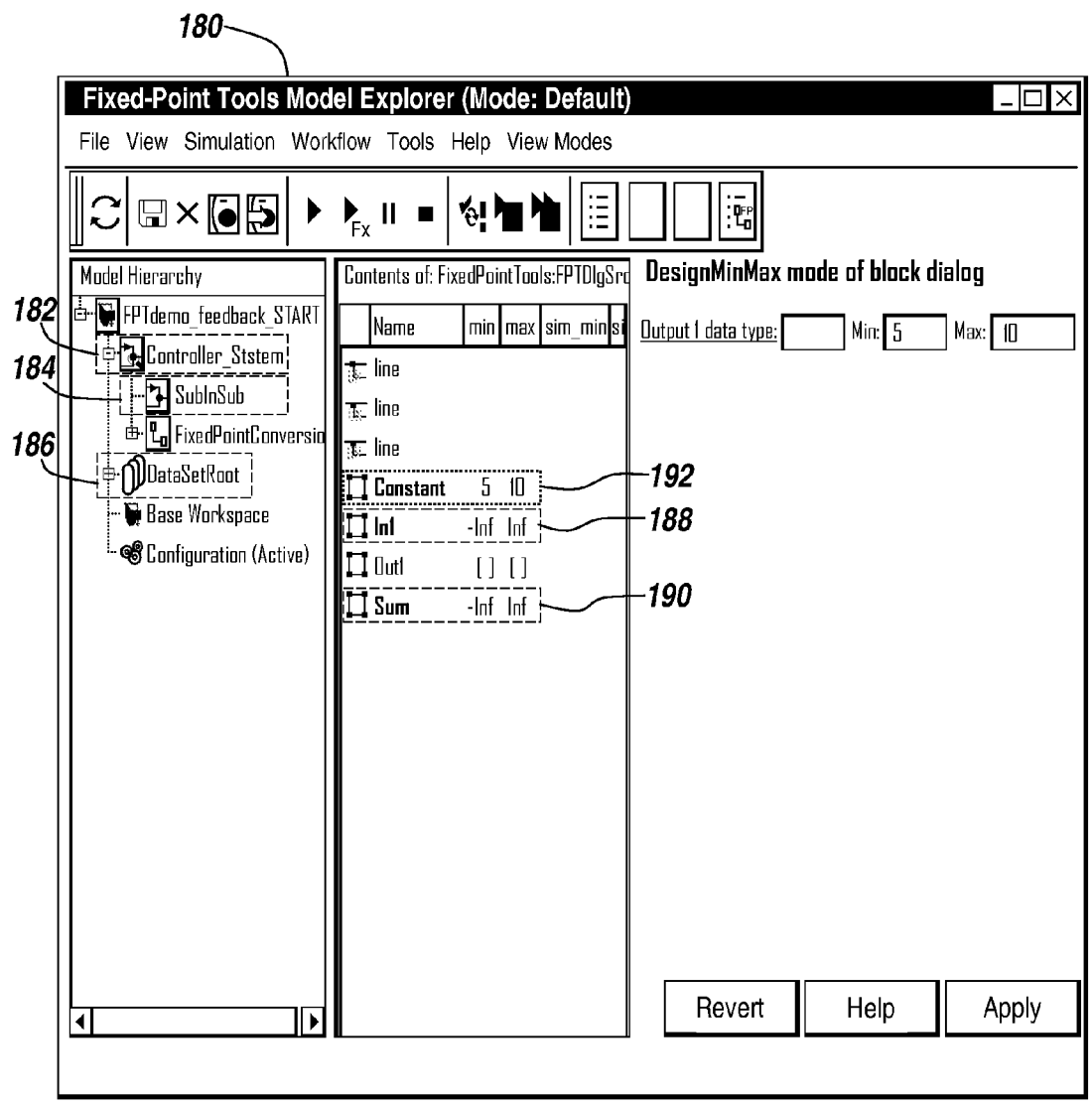
FIGS. 3H and 3I depict screenshots of the workflow manager reconfiguring the model hierarchy and graphical model editor respectively to show progress towards the completion of a task required in the identified workflow.
Figure 3I:
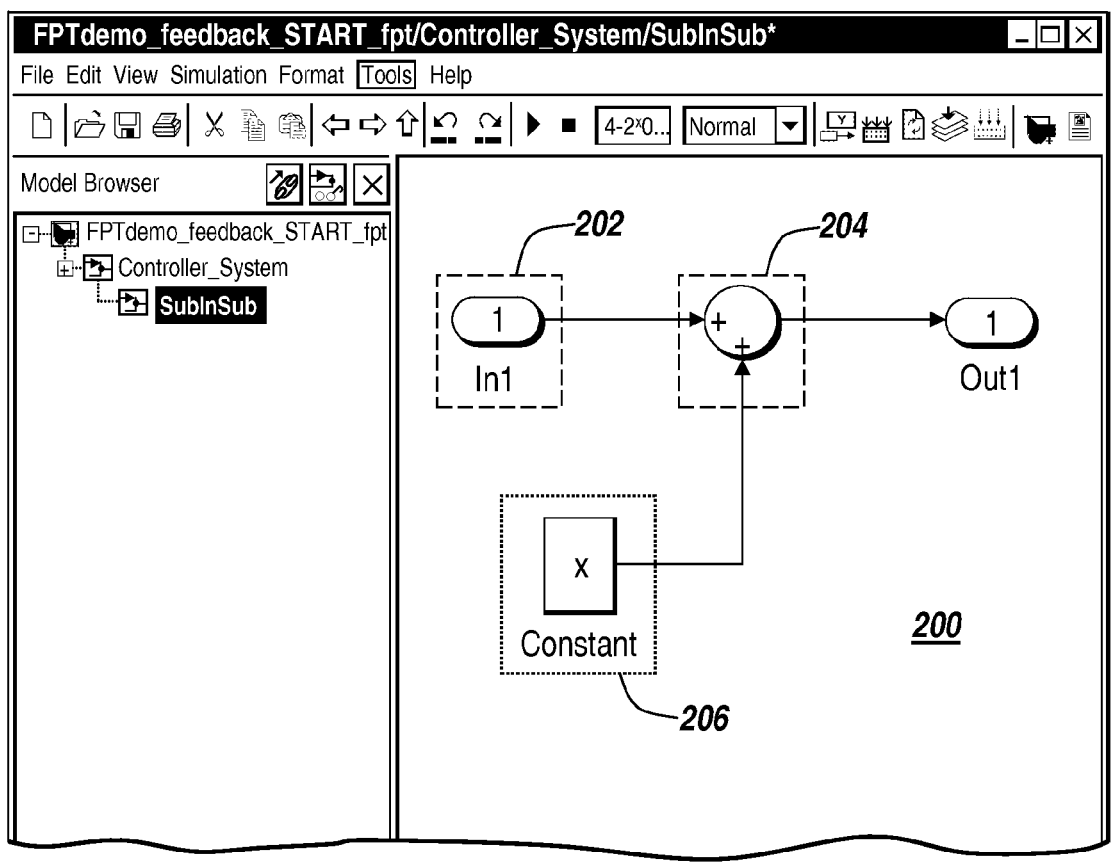

Although FIGS. 3F and 3G use dashed lines surrounding the components to indicate components affected by the current step in the workflow, it should be appreciated that a number of different mechanisms may be used to indicate the affected components. For example, the intensity of the component or component label may be varied to indicate that a particular component is or is not affected by a current step in the workflow. Thus affected components and/or component labels may be displayed in the graphical modeling environment in bold or with increased intensity while non-affected components may be grayed out or simply not shown in a particular view. Alternatively, the components and/or component labels may be displayed using different colors to indicate which model components are affected by the current step in the workflow. It will be appreciated that many different types of indicators may be used within the scope of the present invention.

Another aspect of the workflow manager of the present invention is its ability to show progression toward a goal. For example, once the min/max values in the previous example are entered, the modeling environment provides feedback. That is, as information is entered into the modeling environment for a specific task the result is reflected visually. This allows the user to know what tasks are done and which are remaining. For example, the workflow manager may alter the display so that when the "Min" and "Max" values are entered for "Constant" during the "enter design min/max" an icon turns from yellow (meaning not done) to green (meaning done). Alternatively as depicted in the screenshot 180 of FIG. 3H, the constant label 192 may be surrounded by dotted lines to indicate the value has been entered while model hierarchy elements 182, 184 and 186 and model contents 188 and 190 are surrounded by dashed lines indicating that the workflow is not done with them yet. A similar depiction is shown in the graphical modeling view of FIG. 3I where block diagram element 206 (the constant block) is surrounded by dotted lines to indicate completion in the workflow while block diagram elements 202 and 204 are surrounded by dashed lines to indicate their lack of completion. As noted above, color, display intensity or other forms of indicators may be substituted for those shown herein.

Figure 4:
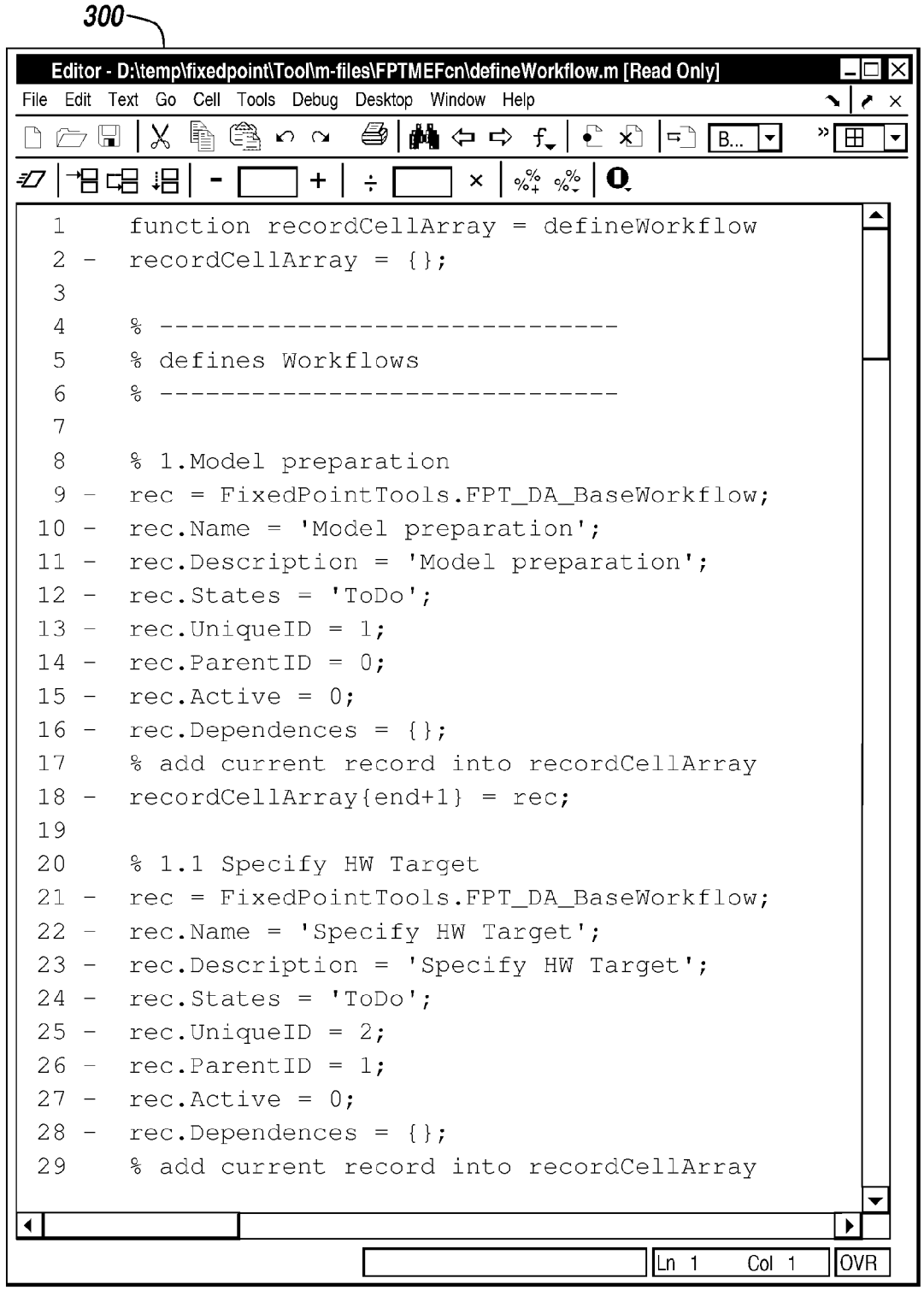
FIG. 4 shows a workflow that may be defined and customized through a provided API.

In one aspect of the present invention, the workflow may reference a programmatic API that allows a user to add custom workflows, to add and remove steps from existing workflows and to perform other tasks. In an exemplary implementation, the API is implemented using a MATLAB (from The MathWorks, Inc of Natick, Mass.) programming interface, but many other implementations are possible within the scope of the present invention. FIG. 4 shows a screenshot 300 of a workflow that may be defined and customized through a provided API. The provision of an API allows a user to define and customize a workflow that synchronizes and controls the layout of the graphical environment. The order of tasks is controlled through the API as well as the dependencies between tasks. For example, if task 2.3 depends on task 1.2, that information can be specified which allows the workflow manager to prevent progress on task 2.3 until task 1.2 is complete. In addition, the API allows a user to specify connectivity to other workflows as well as types of people conducting the workflow. This is important since it allows a lower-level workflow to be reused by more than one higher-level workflow, which may involve more than one user.

Workflow navigation items can be superimposed on the model. For example, a 'forward' and 'backward' button may be present on the model canvas. The appearance of the navigation items, and the workflow in general, can be designed using graphical editing environments that have a set of workflow specific operations (for example, forward, backward, and checkpoint operations) available for drag and drop design. The graphical modeling environment may then operate in two different modes: one for editing the workflow and the appearance to the model designer and another where the workflow is affected. The workflow manager may also be used in conjunction with templatized workflows (or parameterized workflows) and workflow fragments that represent a portion of a larger workflow.

The workflows created and/or altered via the API perform a number of functions. The workflow collects input from the user and performs requested actions. Additionally, the workflow archives measurements, results, and/or data produced by the user input and/or requested actions. The workflow may thus be used to not only achieve a goal but also to produce the necessary artifacts to prove a goal was met. The proof of completion may meet a standard such as DO-178B. Additionally, the workflow and its associated API allow the workflow author to specify which tasks should be validated against acceptance criteria. Acceptance criteria are established for a model prior to conducting a workflow. Many types of acceptance criteria are possible depending on the goals of the workflow or application needs. For example, a typical acceptance criterion is to check that the model can still be compiled after a change to the model. Another example acceptance criterion is that the simulation result matches a specified baseline after a change to the model. In other words, as the user perform tasks within the workflow, the model changes and is therefore continuously validated against a set of acceptance criteria. The acceptance criteria and the workflow may be specified using object constraint language (OCL).

Acceptance criteria may be represented as a separate unique node in the workflow tree. Acceptance criteria include two types of acceptance criteria, workflow author-defined acceptance criteria and user-defined acceptance criteria. The workflow author would determine if user-defined acceptance criteria is required. Acceptance criteria has 'levels'; e.g. mandatory or desired. Tasks may register which acceptance criteria they have to pass in order to be register as passing.

Figure 5:
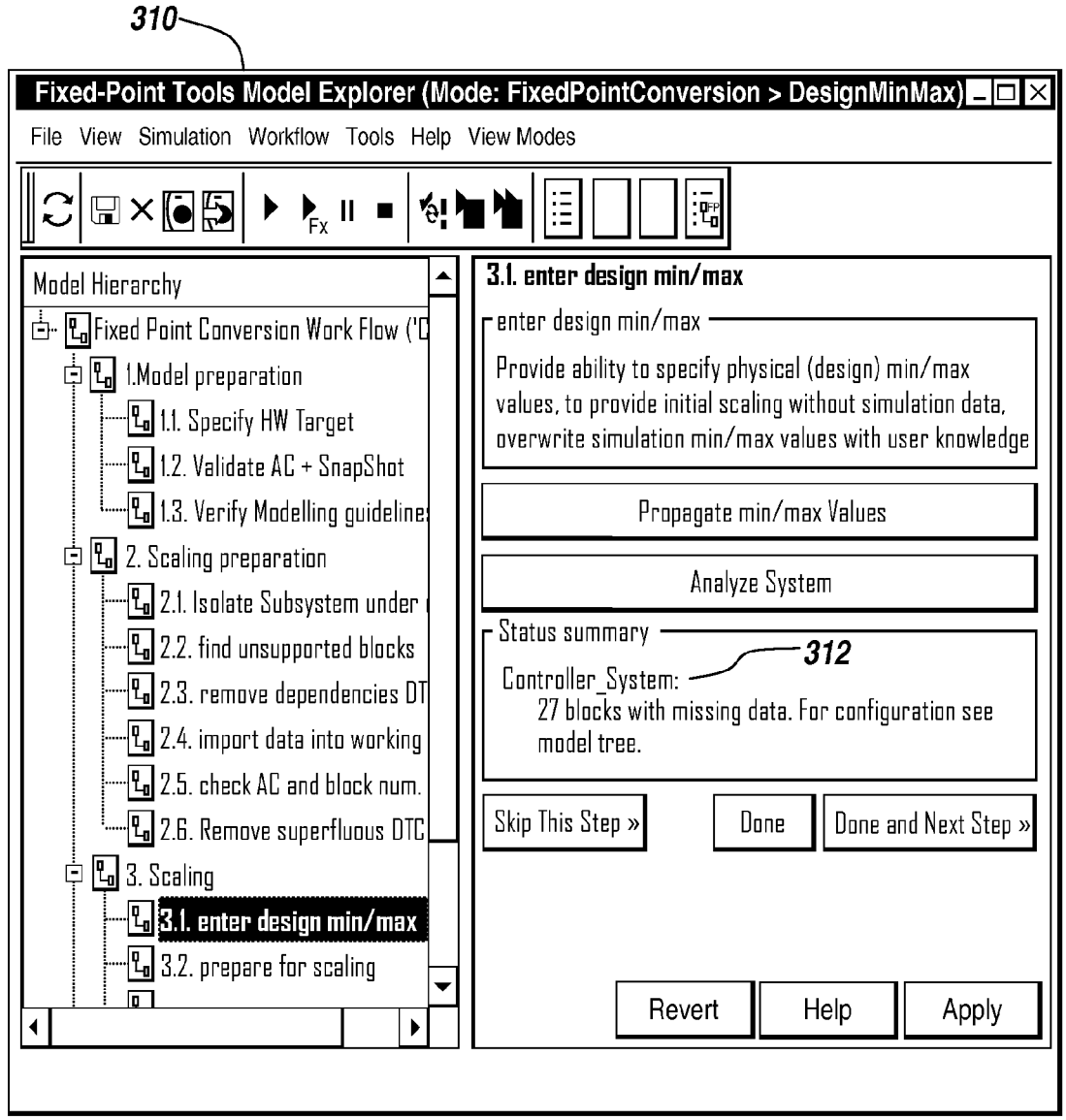
FIG. 5 depicts one aspect of the reporting capability of the workflow manager.

The workflow manager of the present invention also provides reporting capability to indicate to a user how much work remains to be done. This reporting can be output in a variety of methods including but not limited to HTML and PDF reports, for example, or directly in the workflow manager itself. The screenshot 310 in FIG. 5 depicts the workflow manager displaying a "Status summary" 312 that indicates that "27" blocks in the model require min/max data.

In another aspect of the present invention, the workflow manager allows a user to create "snapshots" that represent the current state of execution of the workflow. The snapshot captures both workflow information entered by the user and model information. The snapshot includes all of the data necessary to recreate the exact state of the model and its workflow. Snapshots can be saved and restored thus saving the user the time and effort of recreating an interrupted workflow. Additionally, the snapshot feature allows a user to experiment with various design choices with the knowledge that the user will be able to "back out" the choices to an earlier saved restore point captured by a saved snapshot. Saving and restoring snapshots of a workflow is important since this allows the user to explore a solution space for an optimal result. In one implementation, the full state of the workflow captured in a snapshot is saved as a persistent file on the computer hard drive for later restoration. It will be appreciated that the snapshot may also be saved on other storage mediums accessible to the graphical modeling environment and the workflow manager.

The present invention may also be used to facilitate workflow data logging. Workflow data logging can track how long it took to complete a task, how many times did the user select 'undo', how many blocks were changed, what the number of blocks used was, which configuration changes were made, how often the model was simulated, and many other workflow related tasks. This information can be stored in a centralized database with the results being scored. Future workflow selection can be based on the scoring of the data logs and/or changes to the existing workflow can be made based on scores associated with a data log.

Figure 6A:
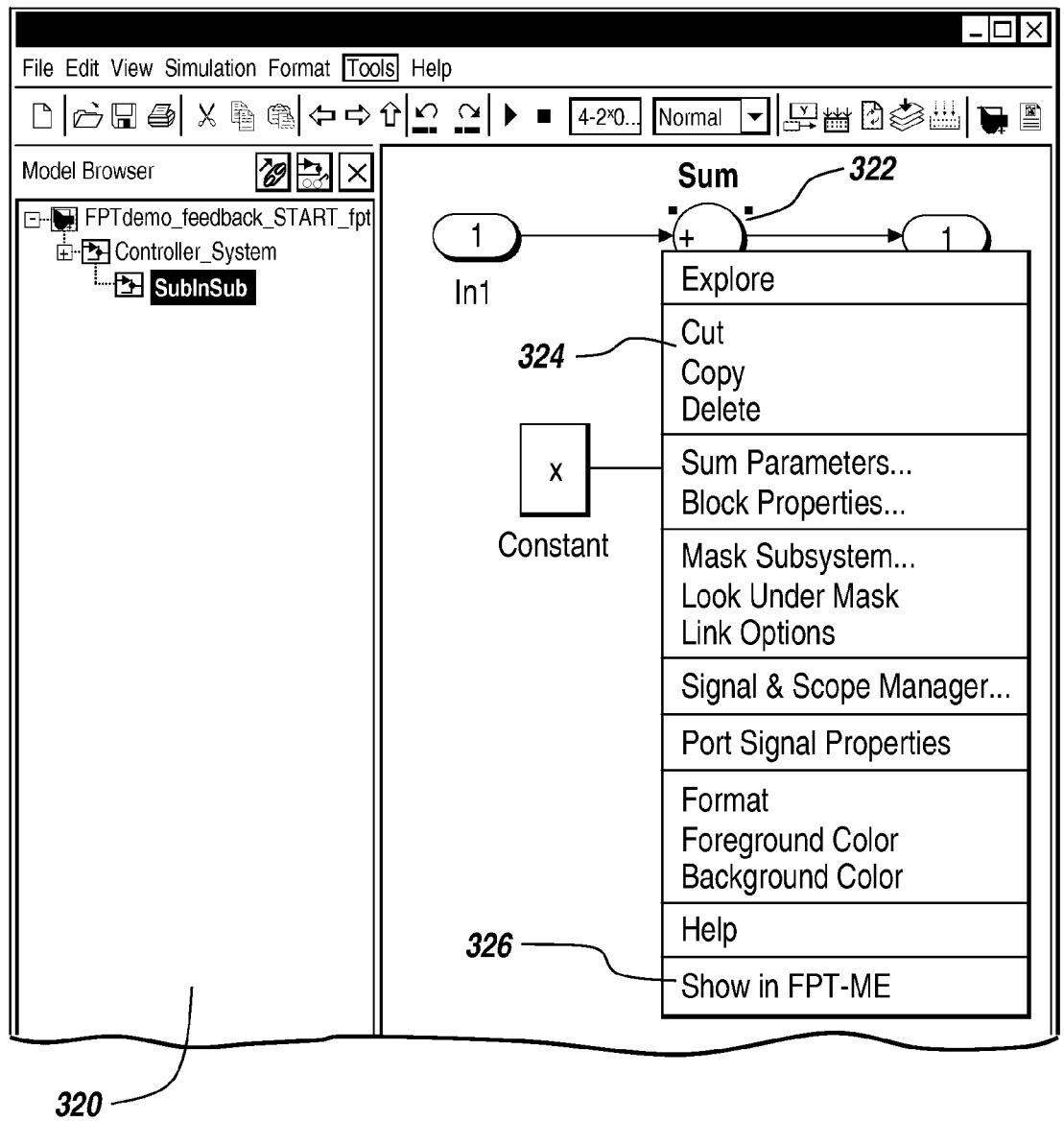
FIGS. 6A and 6B depict the bi-directional linkage provided by the present invention between a block diagram editor and model explorer view.
Figure 6B:
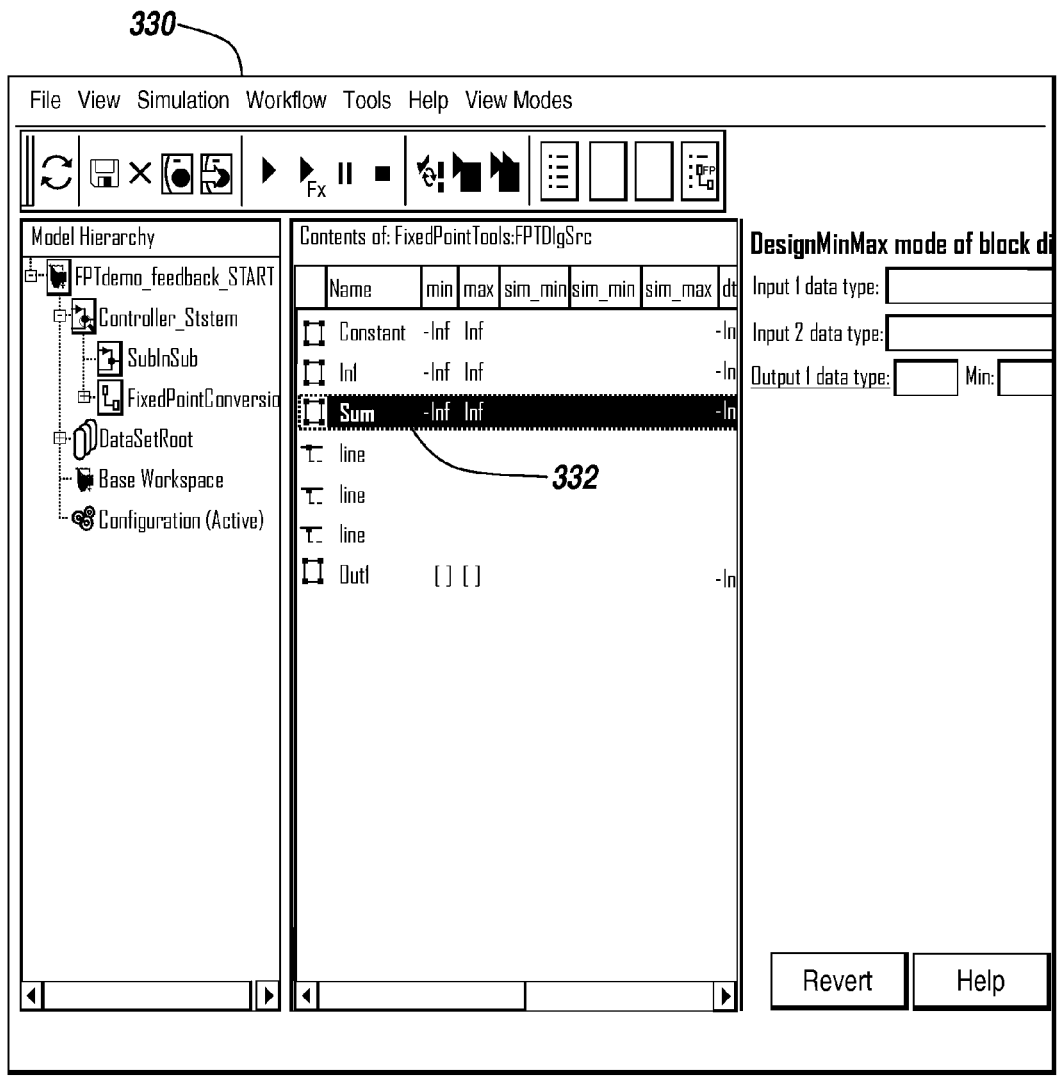

The present invention provides bi-directional linkage from the graphical modeling environment view such as a block diagram view to a hierarchical view of corresponding objects in the workflow. Bi-directional linkage between components of a modeling environment is important since the optimal realization of an action in a workflow is task dependent. The workflow manager initially guides the user to the most optimal component for realizing a task. However the user may choose to navigate to a different component for a variety of reasons such as understanding the problem context better, configuring in a component more familiar to them, etc. For example, a user can navigate from the block diagram to the component view for a task that requires action. FIGS. 6A and 6B depict the bi-directional linkage provided by the present invention between a block diagram editor and component view. The screenshot 320 in FIG. 6A shows the block diagram model associated with the identified workflow. By right clicking (or otherwise selecting) a user causes a pull down menu 324 to be displayed which includes the option 326 of navigating directly to the component view of the components affected by the current task. FIG. 6B shows a screenshot 330 of the corresponding component view, which includes a listing of the sum block 332, to which the user navigates. In other words, the selection by the user of the "Show in FPT-ME" context menu selection 326 for the "Sum" block requiring action brings the user to the same point in the component view for making the desired changes.

As will be apparent from the above discussion, the workflow manager of the present invention is capable of reconfiguring many different types of views in the modeling environment including a graphical modeling editor view, a model hierarchy view showing the hierarchy of the graphical model, which can be the nesting of graphical entities but could also be the nesting of functionality (which is different in case of virtual graphical nesting), a model dependencies view that shows the elements in the model environment that it depends upon such as initialization scripts, header files with data structures, referenced models, and referenced binaries, a compiled model view that shows the model properties after all degrees of freedom such as data type, dimensions, and sample rate have been determined (which may lead to inserting functional units that could be graphically depicted), a model requirements view that shows the requirements of the model that are compiled in a text based document such as a free-form text document or a spreadsheet, but potentially also superimposed on the model as determined by hotlinks between model entities and specific requirements, a model coverage view that shows the model aspects that have been evaluated and how comprehensively they have been evaluated during one or a number of simulations (for example, condition coverage or modified condition/decision coverage, MC/DC), a model simulation results view, a model debugging view that shows values internal to the execution computations and that allows halting the execution at desired points in the flow of computations required for execution, a model profiling view that shows the computational expense of the model entities as established during one or multiple simulation runs, and a contents editor view.

In one aspect of the present invention, the workflow manager synchronizes a dynamically configurable workflow with the modeling environment. For a dynamically configurable workflow, the workflow may be adapted during the design activities. A change in workflow may be predicated upon certain user activity. Instead of a static set of activities, the set of activities becomes dynamically selected. So, if a user selects a nonlinear element to be added to the graphical model, the workflow may be dynamically changed to require a linearization step. This may be based on simulation results as well.

The present invention may be provided as one or more computer-readable programs embodied on or in one or more mediums. The mediums may be a floppy disk, a hard disk, a compact disc, a digital versatile disc, a flash memory card, a PROM, a RAM, a ROM, or a magnetic tape. In general, the computer-readable programs may be implemented in any programming language. Some examples of languages that can be used include MATLAB, Python, FORTRAN, C, C++, C#, or JAVA. The software programs may be stored on or in one or more mediums as object code. Hardware acceleration may be used and all or a portion of the code may run on a FPGA, an ASIC, a graphics processing unit (GPU), or any other piece of computational hardware, including analog, such as, for example, a configurable printed circuit board. The code may run in a virtualized environment such as in a virtual machine. Multiple virtual machines running the code may be resident on a single processor.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

We claim:

1. A non-transitory computer-readable medium storing instructions executable by at least one processor, the computer-readable medium comprising one or more instructions for:
   displaying a step of a workflow associated with a graphical model, the graphical model having a first component and a second component, only the first component being associated with the step;
   receiving a selection of the step; and
   in response to receiving the selection of the step, synchronizing a display of the first component and the second component of the graphical model with an execution of the selected step, where the synchronized display indicates that:
      the first component is associated with the execution of the selected step, and
      the second component is not associated with the execution of the selected step.

2. The computer-readable medium of claim 1, where the workflow is defined via an application programming interface.

3. The computer-readable medium of claim 1, further comprising one or more instructions for:
   registering one or more tasks of the workflow;
   identifying a relative order of the one or more tasks; and
   identifying one or more dependencies of the one or more tasks.

4. The computer-readable medium of claim 1, further comprising:
   one or more instructions for creating a snapshot of a current state of execution of the workflow, the snapshot containing data necessary to recreate the current state.

5. The computer-readable medium of claim 4, further comprising one or more instructions for:
   storing workflow information entered by a user and model information.

6. The computer-readable medium of claim 1, where the workflow includes a plurality of tasks, and
   where the computer-readable medium further comprises:
      one or more instructions for providing status information associated with the plurality of tasks.

7. The computer-readable medium of claim 1, further comprising one or more instructions for:
   permitting connectivity between the workflow and another workflow to be specified; and
   permitting types of people conducting the workflow to be specified.

8. The computer-readable medium of claim 1, further comprising one or more instructions for:
   receiving the workflow via a graphical editing environment.

9. The computer-readable medium of claim 1, further comprising one or more instructions for:
   permitting specification of which tasks of a plurality of tasks in the workflow need to be validated against acceptance criteria.

10. The computer-readable medium of claim 1, further comprising:
    one or more instructions for linking and concurrently displaying a block diagram view and a hierarchical view of the one or more components of the graphical model.

11. A computing device, comprising:
    a graphical programming environment including a plurality of instructions for implementing:
       a graphical model,
       a workflow associated with the graphical model, the workflow including a plurality of tasks, and
       a workflow manager to:
          execute at least one of the plurality of tasks of the workflow, and
          synchronize a display of a plurality of components of the graphical model with an execution of the at least one task, where the synchronized display indicates:
             a first component, in the plurality of components, that is associated with the execution of the at least one task, and
             a second component, in the plurality of components, that is not associated with the execution of the at least one task; and
    a processor to execute the instructions of the graphical programming environment.

12. The computing device of claim 11, wherein the workflow manager further:
    creates a snapshot of a current state of execution of the workflow, the snapshot containing data necessary to recreate the current state.

13. The computing device of claim 11, wherein the first component being associated with the execution of the at least one task includes the first component being affected by the execution of the at least one task.

14. A method, comprising:
    identifying a workflow associated with a graphical model, the workflow including a plurality of tasks;
    executing at least one of the plurality of tasks of the workflow;
    displaying a plurality of components of the graphical model; and
    synchronizing a display of the plurality of components of the graphical model with an execution of the at least one of the plurality of tasks, where the synchronized display indicates that:
       a first component is associated with the execution of the at least one of the plurality of tasks, and a second component is not associated with the execution of the at least one of the plurality of tasks.

15. The method of claim 14, further comprising:
permitting a user to define the workflow via an application programming interface.

16. The method of claim 15, where permitting the user to define the workflow includes permitting the user to register the plurality of tasks of the workflow, identify a relative order of the plurality of tasks, and identify dependencies of the plurality of tasks.

17. The method of claim 14, further comprising:
creating a snapshot of a current state of execution of the workflow, the snapshot containing data necessary to recreate the current state.

18. The method of claim 14, further comprising:
providing information regarding status of a task in the plurality of tasks.

19. The method of claim 14, further comprising:
permitting a user to specify connectivity between the workflow and another workflow, or
permitting the user to specify types of people conducting the workflow.

20. The method of claim 14, further comprising:
permitting a user to specify which of the plurality of tasks in the workflow need to be validated against acceptance criteria.

21. The method of claim 14, where displaying the plurality of components includes:
linking and concurrently displaying a block diagram view and a hierarchical view of the plurality of components.

22. A system, comprising:
a processor for:
identifying a workflow associated with a graphical model;
executing the workflow in a plurality of stages;
displaying a plurality of components of the graphical model; and
synchronizing a display of the plurality of components of the graphical model with an execution of a current one of the stages of the workflow, where the synchronized display indicates that:
a first component is associated with the execution of the current one of the stages of the workflow, and
a second component is not associated with the execution of the current one of the stages of the workflow.

23. The system of claim 22, wherein the processor further:
creates a snapshot of a current state of execution of the workflow, the snapshot containing data necessary to recreate the current state.

* * * * *

UNITED STATES PATENT AND TRADEMARK OFFICE
CERTIFICATE OF CORRECTION

PATENT NO. : 8,261,233 B2  
APPLICATION NO. : 11/841808  
DATED : September 4, 2012  
INVENTOR(S) : Peter Szpak et al.

Page 1 of 1

It is certified that error appears in the above-identified patent and that said Letters Patent is hereby corrected as shown below:

Sheet 12 of 15 (Drawings) line 16, "rec.Dependences" should be -- rec.Dependencies --

Sheet 12 of 15 (Drawings) line 28, "rec.Dependences" should be -- rec.Dependencies --

Signed and Sealed this  
Twenty-sixth Day of February, 2013

Teresa Stanek Rea  
*Acting Director of the United States Patent and Trademark Office*